United States Patent
Zhang et al.

(10) Patent No.: US 10,969,903 B2
(45) Date of Patent: Apr. 6, 2021

(54) METHOD, DEVICE AND MOBILE TERMINAL FOR PREVENTING FALSE-TOUCH ON TOUCH SCREEN

(71) Applicant: GUANGDONG OPPO MOBILE TELECOMMUNICATIONS CORP., LTD., Guangdong (CN)

(72) Inventors: Qiang Zhang, Guangdong (CN); Yixue Ge, Guangdong (CN); Hao Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/438,048

(22) Filed: Jun. 11, 2019

(65) Prior Publication Data
US 2019/0294296 A1   Sep. 26, 2019

Related U.S. Application Data

(63) Continuation of application No. 16/215,370, filed on Dec. 10, 2018, and a continuation of application No. PCT/CN2017/107537, filed on Oct. 24, 2017.

(30) Foreign Application Priority Data

Dec. 16, 2016   (CN) .......................... 201611168040.2

(51) Int. Cl.
*G06F 3/041*   (2006.01)
*G06F 3/0488*   (2013.01)
(Continued)

(52) U.S. Cl.
CPC .......... *G06F 3/0418* (2013.01); *G06F 3/0481* (2013.01); *G06F 3/0488* (2013.01);
(Continued)

(58) Field of Classification Search
CPC .... G06F 3/0418; G06F 3/0481; G06F 3/0488; G06F 2203/04808
See application file for complete search history.

(56) References Cited

U.S. PATENT DOCUMENTS

| | | |
|---|---|---|
| 10,386,960 B1 | 8/2019 | Smith |
| 2003/0063073 A1 | 4/2003 | Geaghan |

(Continued)

FOREIGN PATENT DOCUMENTS

| | | |
|---|---|---|
| CN | 102289321 A | 12/2011 |
| CN | 103064548 A | 4/2013 |

(Continued)

OTHER PUBLICATIONS

International Search Report issued in corresponding International application No. PCT/CN2017/107537, dated Jan. 22, 2018 (12 pages).

(Continued)

*Primary Examiner* — Charles V Hicks
(74) *Attorney, Agent, or Firm* — Ladas & Parry LLP

(57) ABSTRACT

The embodiment of the disclosure discloses a method, a device and a mobile terminal for preventing a false-touch on a touch screen. The method may include comparing an area of a touch area corresponding to a touch event with a preset area threshold; determining whether the touch area overlaps with a touch button area, when the area of the touch area is smaller than the preset area threshold; marking touch points inside the touch button area as invalid touch points, shielding location coordinates of the invalid touch points and location coordinates of the touch points inside a preset area, reporting location coordinates of remaining touch points, when the touch area corresponding to the touch event partially overlaps with the touch button area; and reporting location coordinates corresponding to the touch event, when (Continued)

the touch area corresponding to the touch event does not overlap with the touch button area.

13 Claims, 8 Drawing Sheets

(51) Int. Cl.
*G06F 3/0481* (2013.01)
*G06F 3/044* (2006.01)

(52) U.S. Cl.
CPC .............. *G06F 3/041* (2013.01); *G06F 3/044* (2013.01); *G06F 3/0416* (2013.01); *G06F 3/04883* (2013.01); *G06F 2203/04808* (2013.01)

(56) References Cited

U.S. PATENT DOCUMENTS

| | | |
|---|---|---|
| 2006/0128468 A1 | 6/2006 | Yoshikawa |
| 2010/0070912 A1 | 3/2010 | Zaman et al. |
| 2011/0050576 A1 | 3/2011 | Forutanpour |
| 2011/0063228 A1 | 3/2011 | St. Pierre |
| 2011/0102357 A1 | 5/2011 | Kajitani |
| 2011/0157096 A1 | 6/2011 | Drumm |
| 2011/0187661 A1 | 8/2011 | Wakizaka |
| 2012/0319959 A1 | 12/2012 | Saponas |
| 2013/0222286 A1* | 8/2013 | Kang ..................... G06F 3/041 345/173 |
| 2014/0049502 A1 | 2/2014 | Santos |
| 2014/0232676 A1 | 8/2014 | Shimizu |
| 2014/0298266 A1 | 10/2014 | Lapp |
| 2014/0320459 A1 | 10/2014 | Pettersson |
| 2015/0135108 A1 | 5/2015 | Pope |
| 2015/0212649 A1 | 7/2015 | Oshita |
| 2015/0242008 A1 | 8/2015 | Beckman |
| 2015/0331548 A1 | 11/2015 | Zhang |
| 2016/0188181 A1 | 6/2016 | Smith |
| 2017/0371479 A1 | 12/2017 | Li |
| 2018/0113562 A1 | 4/2018 | Ito |
| 2018/0321841 A1 | 11/2018 | Lapp |
| 2018/0349346 A1 | 12/2018 | Hatori |
| 2019/0056834 A1 | 2/2019 | Blondin |
| 2019/0179476 A1 | 6/2019 | Thomas |
| 2019/0179485 A1 | 6/2019 | Zhang |
| 2019/0294296 A1 | 9/2019 | Zhang |

FOREIGN PATENT DOCUMENTS

| | | |
|---|---|---|
| CN | 103164074 A | 6/2013 |
| CN | 103176653 A | 6/2013 |
| CN | 104020878 A | 9/2014 |
| CN | 104423661 A | 3/2015 |
| CN | 104571709 A | 4/2015 |
| CN | 104635985 A | 5/2015 |
| CN | 104714691 A | 6/2015 |
| CN | 104714692 A | 6/2015 |
| CN | 104731498 A | 6/2015 |
| CN | 105068690 A | 11/2015 |
| CN | 105404463 A | 3/2016 |
| CN | 106126099 A | 11/2016 |
| CN | 106775084 A | 5/2017 |
| EP | 2657817 A1 | 10/2013 |

OTHER PUBLICATIONS

First Notification of an Office Action issued in corresponding Chinese application No. 201611188040.2, dated Nov. 30, 2018 (6 pages).

European Search Report issued in corresponding application No. 17880669.1, dated May 2, 2019 (9 pages).

* cited by examiner

METHOD, DEVICE AND MOBILE TERMINAL FOR PREVENTING FALSE-TOUCH ON TOUCH SCREEN

CROSS-REFERENCE TO RELATED APPLICATION

The present application is a continuation application of U.S. patent application Ser. No. 16/215,370, filed Dec. 10, 2018, which is a continuation application of a PCT application No. PCT/CN2017/107537 filed on Oct. 24, 2017. The PCT application claims priority to a Chinese application No. CN201611168040.2 filed on Dec. 16, 2016, titled "METHOD AND DEVICE FOR PREVENTING FALSE-TOUCH ON TOUCH SCREEN, MOBILE TERMINAL AND STORAGE MEDIUM". The entirety of the above-mentioned application is hereby incorporated by reference herein.

TECHNICAL FIELD

The present disclosure relates to a touch control technical field, and particularly to a method, a device and a mobile terminal for preventing a false-touch on a touch screen.

BACKGROUND

With the development of technology, mobile terminals can be used for communication and entertainment. In order to provide a better sensory effect, a size of a touch screen of the mobile terminal is increasing, and the mobile terminal mobile terminal develops in a narrow border or no border.

However, the user's holding posture and operating habits may cause a false touch on an edge area of the touch screen when the user operates the mobile terminal with one hand.

SUMMARY

The present disclosure provides a method, a device and a mobile terminal, for preventing a false-touch on a touch screen.

In the first aspect, the embodiment of the present disclosure provides a method for preventing a false-touch on a touch screen. The method may include comparing an area of a touch area corresponding to a touch event with a preset area threshold, when the touch event is detected; determining whether the touch area corresponding to the touch event overlaps with a touch button area, when the area of the touch area is smaller than the preset area threshold; marking touch points corresponding to the touch event inside the touch button area as invalid touch points, shielding location coordinates of the invalid touch points and location coordinates of the touch points inside a preset area, reporting location coordinates of remaining touch points, when the touch area corresponding to the touch event partially overlaps with the touch button area; and reporting location coordinates corresponding to the touch event, when the touch area corresponding to the touch event does not overlap with the touch button area.

In the second aspect, the embodiments of the disclosure further provide a device for preventing a false-touch on a touch screen. The device may include an area comparison module configured to compare an area of a touch area corresponding to a touch event with a preset area threshold, when the touch event is detected; an area determination module configured to determine whether the touch area corresponding to the touch event overlaps with a touch button area, when the area of the touch area is smaller than the preset area threshold; and a reporting module configured to mark touch points corresponding to the touch event inside the touch button area as invalid touch points, shield location coordinates of invalid touch points and location coordinates of the touch points inside a preset area, and report location coordinates of remaining touch points, when the touch area corresponding to the touch event partially overlaps with the touch button area; and report location coordinates corresponding to the touch event, when the touch area corresponding to the touch event does not overlap with the touch button area.

In the third aspect, the embodiments of the disclosure further provide a mobile terminal. The mobile terminal may include a memory, a processor, and a computer program stored in the memory and operable in the processor. Wherein the processor implements the following blocks when executing the computer program: comparing an area of a touch area corresponding to a touch event with a preset area threshold, when the touch event is detected; determining whether the touch area corresponding to the touch event overlaps with a touch button area, when the area of the touch area is smaller than the preset area threshold; marking touch points corresponding to the touch event inside the touch button area as invalid touch points, shielding location coordinates of the invalid touch points and location coordinate of the touch points inside a preset area, reporting the location coordinates of remaining touch points, when the touch area corresponding to the touch event partially overlaps with the touch button area; and reporting location coordinates corresponding to the touch event, when the touch area corresponding to the touch event does not overlap with the touch button area.

In the embodiment of the present disclosure, when a touch event is detected, the area of the touch area corresponding to the touch event is compared with a preset area threshold. When the area of the touch area is smaller than the preset area threshold, whether the touch area corresponding to the touch event overlaps with the touch button area is determined. A reporting operation or a shielding operation of the touch coordinates corresponding to the touch event will be performed, based on the determination result, so as to implement the preventing a false-touch function in the touch button area and the preset area. The embodiments of the disclosure solve the problem that the function for preventing false-touch on the edge of the screen is invalided, due to the touch operation on the touch button area of the touch screen cannot be accurately detected. The accuracy of a touch event reporting is improved in the multi-touch operation, and the effect of improving the processing accuracy of the touch event of the mobile terminal is achieved.

DETAILED DESCRIPTION OF PREFERRED EMBODIMENTS

Figure 1:
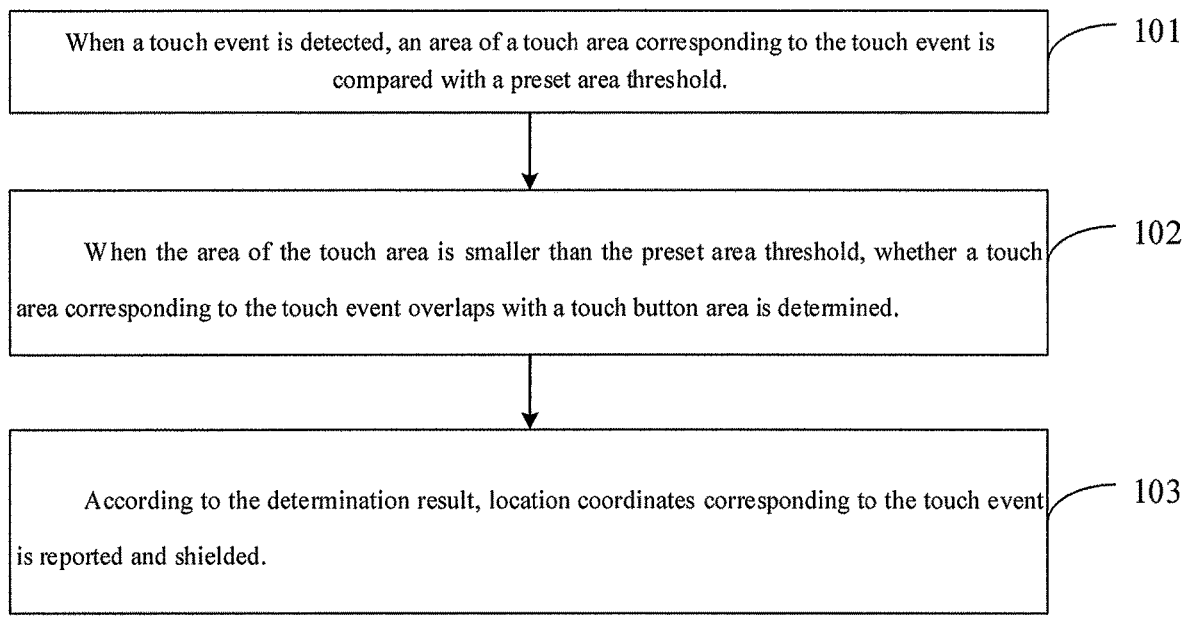
FIG. 1 is a flowchart of a method for preventing a false-touch on a touch screen according to an embodiment of the present disclosure.

The present disclosure will be further described in detail below with reference to the accompanying drawings and embodiments. It is understood that the specific embodiments described herein are merely illustrative of the disclosure and are not intended to limit the disclosure. It should also be noted that, for the convenience of description, only some, but not all of the structures related to the present disclosure are shown in the drawings.

Before discussing the exemplary embodiments in more detail, it should be noted that some exemplary embodiments are described as a process or method depicted as a flowchart. Although the flowcharts describe the various blocks as a sequential process, many of the blocks can be implemented in parallel, concurrently, or concurrently. In addition, the order of the blocks can be rearranged. The process may be terminated when its operation is completed, but may also have additional blocks not included in the figures. The processing may correspond to methods, functions, procedures, subroutines, and the like.

As discussed above, the user's holding posture and operating habits may cause a false touch on an edge area of the touch screen when the user operates the mobile terminal with one hand. For example, when holding the mobile phone in the right hand, if an application (APP) interface is clicked on with the right thumb in the upper left corner, the palm of the right hand is likely to false touch the lower right edge area of the touch screen. In order to prevent the false touch, an area on an edge of the touch screen can be set as an preventing false-touch area. If other areas of the touch screen are clicked while the preventing false-touch area is pressed, the location coordinates in the preventing false touch area will be released. That is, the location coordinates in the preventing false-touch area are not reported, and the location coordinates in the other areas are reported. Thereby, the touch event in other areas of the touch screen is responded, to prevent the false touch on the edge area of the touch screen.

However, in some cases, the palm touches the touch screen over a large area, and most of the touch area is in the left corner or right corner of the touch screen. That is, a large part of the touch area is located in an area of the touch buttons (such as a menu button, a HOME button, and a back button and so on). The touch button area often includes blank areas, the blank areas has no touch electrode, and the touch on the blank areas cannot be sensed. Therefore, the touch area being detected may be smaller than the actual touch area, and the palm touch may be mistakenly determined as a normal finger contact, thereby causing the preventing of the false-touch on the edge area is invalid.

In view of this, the disclosure provides a method for preventing a false touch on a touch screen.

FIG. 1 is a flowchart of a method for preventing a false touch on a touch screen according to an embodiment of the present disclosure. The method may be implemented by a device for preventing a false touch. The device may be implemented by software and/or hardware, and may be integrated into a mobile terminal. As illustrated in FIG. 1, the method may include the following blocks.

In block 101, when a touch event is detected, an area of a touch area corresponding to the touch event is compared with a preset area threshold.

In the embodiment, the touch events may include various operations in touch with the touch screen, such as clicking, long press, sliding and so on. When the user is holding the mobile terminal, the palm can easily touch the edge of the touch screen, thereby causing a false touch on the screen. Therefore, the screen area that is easily false touched can be set as a preset area. The preset area can be determined by many ways. For example, a manner and posture of holding the mobile terminal may be investigated. The screen area that is easily false touched may be set as the preset area according to the manner and the posture, and the setting can be a factory setting. For another example, before using the mobile terminal, the manner and posture can be recorded in the mobile terminal. Data for holding the mobile terminal can be collected by the mobile terminal. An area that is easily false touched may be determined by analyzing the collected data, and the area can be set as the preset area. In the embodiment, the number of the preset area is not limited. The shape and/or size of the preset area can also be adjusted by the user.

In the embodiment, the mobile terminal may be a device integrated with a touch screen such as a smart phone or a tablet computer, and the mobile terminal may have a narrow frame of have no frame. A function for preventing false-touch on the edge of the screen can be added to the mobile terminal, and a system of the mobile terminal may automatically turn on the function according to an actual situation. The user can turn on the function according to individual needs. The preset area is an area with a shape and/or a size at the edge of the touch screen. If other areas of the touch screen are clicked while the preset area is pressed, the finger information on the preset area will be released, and the click on other areas of the touch screen is responded. For example, the system can detect the posture of the mobile terminal, and automatically turn on the function when the mobile terminal is in a vertical screen state. The function can be turned off when the mobile terminal is in a horizontal screen state. For another example, the system can detect the manner of holding the mobile terminal. When the holding manner is a one-handed manner, the function is turned on, and when the holding manner is a two-handed manner, the function is turned off. In this embodiment, it is assumed that the function is turned on.

Figure 2A:
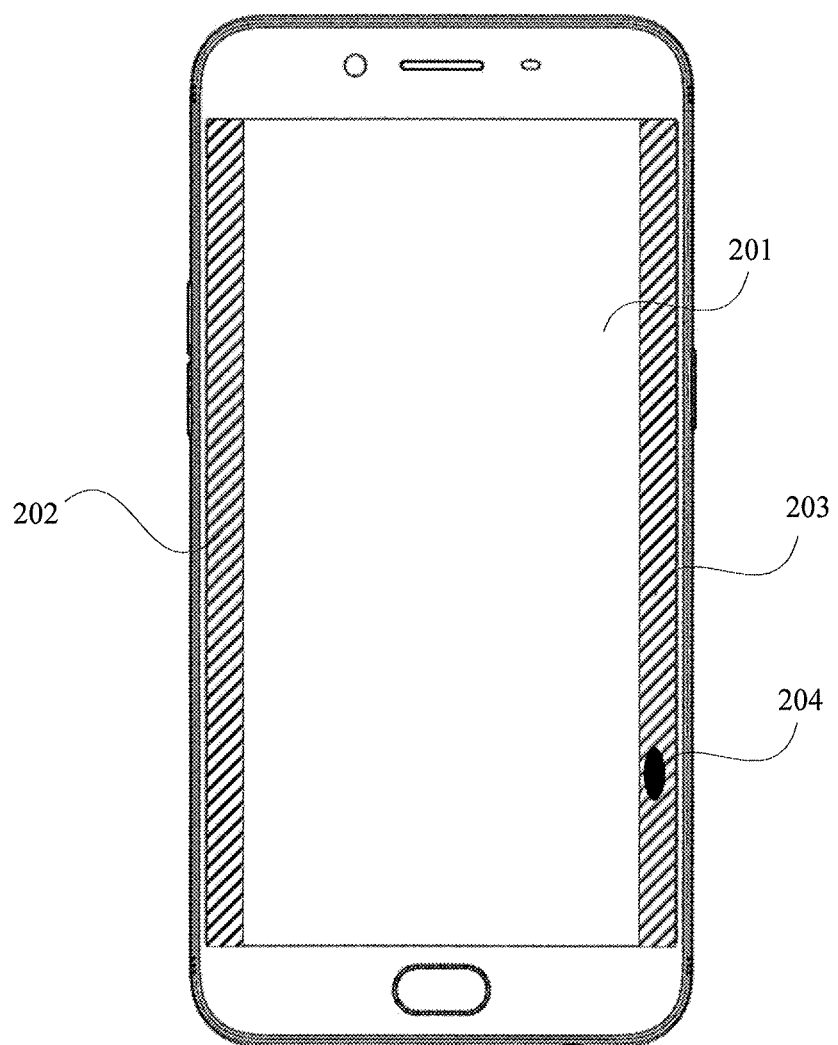
FIG. 2a is a schematic view of the touch screen of a mobile terminal according to an embodiment of the present disclosure.

The touch screen of the mobile terminal may include a resistive touch screen, a capacitive touch screen, a piezoelectric touch screen and so on. When the touch screen is touched by a user, the touch screen can detect a touch information, and identify the touch event. Taking the capacitive touch screen as an example, the touch screen can sense the change of the capacitance. When the touch screen is touched, the touch screen may sense the change of the capacitance and identify a touch information. The touch information may include a x coordinate, a y coordinate, and a size of the touch area (including the length and width, etc) and the number of fingers touching the touch screen. The coordinate information may be reported to an upper layer through an input system, and the touch input on the touch screen can be detected by the touch information. FIG. 2*a* is a schematic view of the touch screen of the mobile terminal according to an embodiment of the present disclosure. As illustrated in FIG. 2*a*, the left side of the touch screen 201 includes a first preset area 202, the left side of the touch screen 201 includes a second preset area 203. A position 204 is located in the second preset area 203, and when the position 204 is touched, a touch input may be detected on the preset area of the touch screen.

In the embodiment, the preset area may also have other shapes or sizes, and FIG. 2*a* is only for illustrative purposes. As illustrated in FIG. 2*a*, the shape of the preset area may be a rectangle, and the length is the same as the length of display area of the touch screen. The shape of the preset area may also be a semi-ellipse or other irregular shape, and the size may also be set according to actual scene. In addition, a position of the preset area can also be adjusted, for example, the preset area may be positioned at the bottom left corner and/or bottom right corner of the edge of the touch screen.

In the embodiment, a preset area threshold may be configured to distinguish whether the touch event is a normal touch or a false touch. The preset area threshold may be a fixed area value preset or a variable area value that is dynamically adjusted according to a preset rule. Many ways may be configured to determine the preset area threshold. For example, an area of the touch input detected by mobile terminals may be investigated when the screen is normally touched by user groups. The area of the touch input investigated may be analyzed to determine the preset area threshold. The preset area threshold may be factory set by the mobile terminal. For another example, before using the mobile terminal, the user can also calibrate the area of the touch. The mobile terminal can collect relevant area data when the mobile is normally operated, and obtain the preset area threshold corresponding to the normal operation by analyzing the collected data. In addition, during the use of the mobile terminal, the area data of the touch input may be collected in real time, and the preset area threshold may be updated and adjusted. In the embodiment, the preset area threshold may also be related to the properties of the touch input, and the properties may include touch position, touch time, user's average finger width and so on.

When the touch event is detected, the touch information of the touch event may be identified, thereby determining touch area according to the size of the touch area and the number of fingers touching the touch screen.

In block 102, when the area of the touch area is smaller than the preset area threshold, whether a touch area corresponding to the touch event overlaps with a touch button area is determined.

In the embodiment of the present disclosure, when the area of the touch area is smaller than the preset area threshold, the touch event may be identified as the normal touch. In order to improve the accuracy for determining the false touch, whether the touch area corresponding to the touch event overlaps with the touch button area may need to be determined. The touch button area may include a touch button, a blank portion between the touch buttons and the frame of the mobile terminal. Due to the touch electrode is not distributed in the blank portion, the touch area cannot be identified. Therefore, most of the touch area corresponding to the false touch may not be identified. The touch area of the false touch being detected is smaller than the preset area threshold, so that the false touch may be mistaken for the normal touch to respond, thereby affecting the normal use of the users. The distribution of the touch buttons varies according to the type of the mobile terminal, and may generally include at least one of a return button, a HOME button, and a menu button. When whether the touch area overlaps with the touch button area is determined, a position of the touch button and a surrounding area thereof may be referred to. The size of the surrounding area can be determined by the accuracy of a sensor. There may be multiple ways to determine whether the touch area overlaps with the touch button area, for example, determining whether the touch area overlaps with the touch button area, according to the location coordinates of the touch point corresponding to the touch event. In the embodiment, the overlap may include partial overlap or fully overlap.

In block 103, according to the determination result, location coordinates corresponding to the touch event is reported and shielded.

Wherein, the determination result may include that the touch area corresponding to the touch event completely inside or overlaps with the touch button area, partially overlaps with the touch button area or does not overlap with the touch button area. In some embodiments, the touch area corresponding to the touch event may completely inside or overlap with the touch button area, and due to the touch input acting on the blank portion of the touch button area cannot be detected, the touch area detected is smaller than the preset area threshold. In this case, the function for preventing a false-touch on the edge of the screen may be turned on, in order to report or shield the location coordinates corresponding to the touch event. In other embodiments, the touch area corresponding to the touch event may partially overlap with the touch button area, and when the overlapping area is large, the touch area being detected may be smaller than the preset area threshold. In this case, the function for preventing false-touch on the edge of the screen may be turned on. For example, when the location coordinates corresponding to the touch input are located at the left corner and right corner of the mobile terminal, that is, the touch input is an operation of touching the touch button area, the function for preventing false-touch on the edge of the screen may be turned on. In another embodiment, the touch area corresponding to the touch event does not overlap with the touch button area, the touch area corresponding to the touch input is considered to be an actual touch event. If the area of the touch area corresponding to the touch event is greater than the preset area threshold, the function for preventing-false touch on the edge of the screen may be turned on. If the area of the touch area corresponding to the touch event is less than the preset area threshold, the touch event is considered to be the normal operation, and the function for preventing false-touch on the edge of the screen may be turned off to response the touch event.

In the embodiment of the present disclosure, the location coordinates corresponding to the touch event can be reported or shielded according to a determination result. If the location coordinates are reported, the touch input on the screen may be detected by the touch event, and the system can respond to the touch input. If the location coordinates are shielded, the touch event is determined to be a false touch, and the touch information corresponding to the touch event is released, and the preventing of the false-touch is implemented.

In the embodiment of the present disclosure when a touch event is detected, the rear of the touch area corresponding to the touch event is compared with a preset area threshold. When the area of the touch area is smaller than the preset area threshold, whether the touch area corresponding to the touch event overlaps with the touch button area is determined. Performing a reporting operation or a shielding operation of the location coordinates corresponding to the touch event, based on the determination result, so as to implement the preventing a false-touch function in the touch button area and the preset area. The embodiment of the disclosure solves the problem that the touch input in the touch button area cannot be accurately detected, which causes the touch screen edge to prevent false touch failure, improves the accuracy of the multi-touch input and improves the effect of the processing accuracy of touch events of the mobile terminal.

Figure 3:
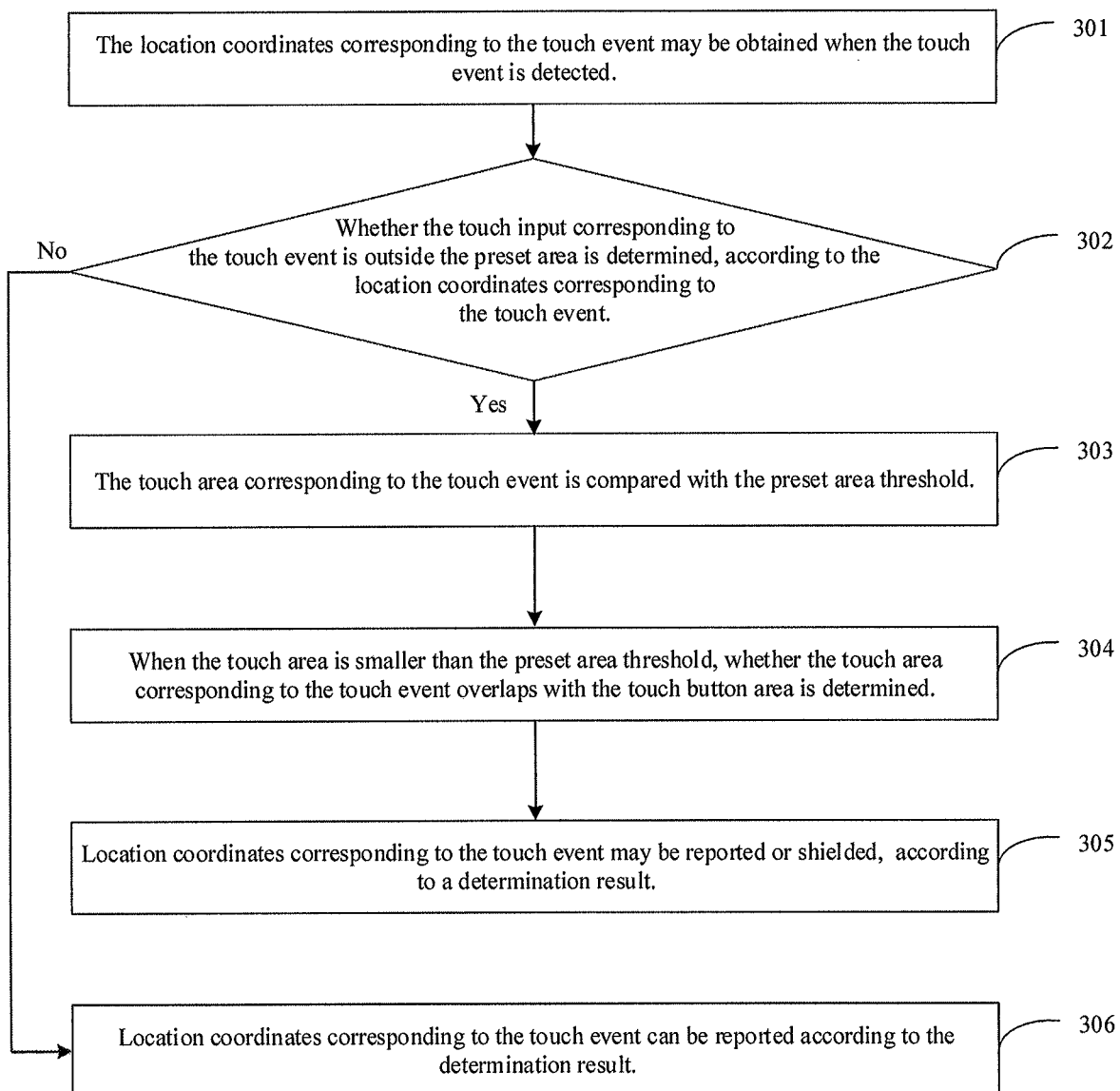
FIG. 3 is another flowchart of the method for preventing the false-touch on the touch screen according to an embodiment of the present disclosure.

FIG. 3 is another flowchart of the method for preventing a false-touch on a touch screen according to an embodiment of the present disclosure. The present embodiment is based on the foregoing embodiment. In this embodiment, before the block "an area of a touch area corresponding to the touch event is compared with a preset area threshold", the method may further include determining whether at least one touch coordinate of the touch input is inside the preset area, according to the location coordinates of the touch input corresponding to the touch event. If the touch input is inside the preset area, the area of the touch area is compared with the preset area threshold.

Correspondingly, the method of this embodiment may include the following blocks.

In block 301, the location coordinates corresponding to the touch event may be obtained when the touch event is detected.

In block 302, whether the touch input corresponding to the touch event is outside the preset area is determined, according to the location coordinates corresponding to the touch event. If no, go to block 303, and if yes, go to block 306.

Figure 2B:
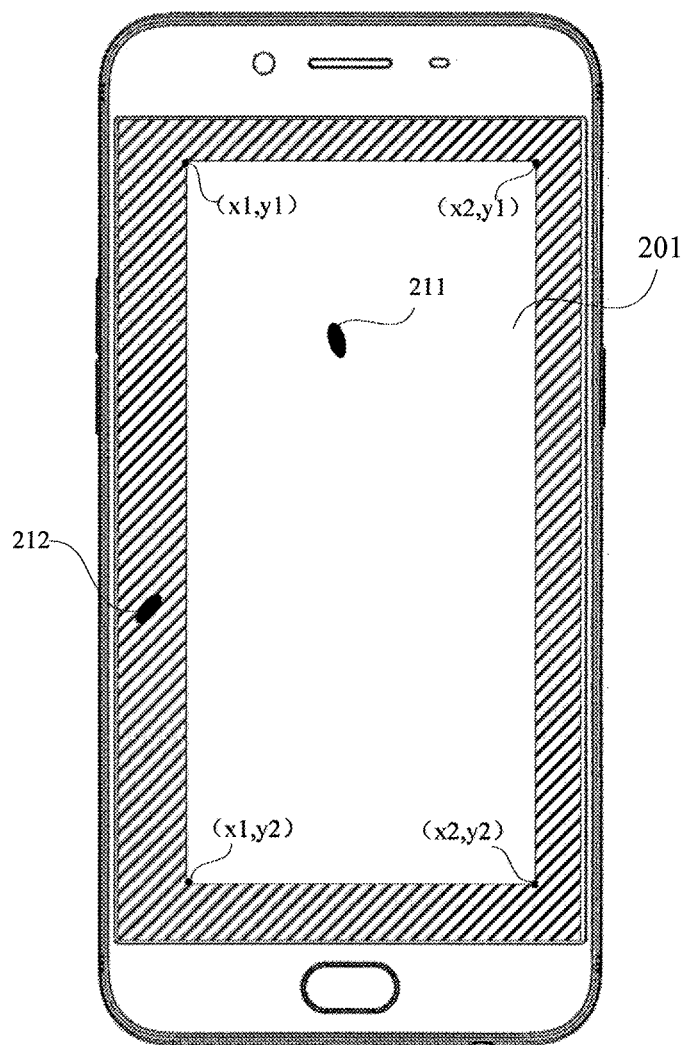
FIG. 2b is another schematic view of a touch screen of the mobile terminal according to an embodiment of the present disclosure.

In the embodiment of the present disclosure, an area non-overlapping with the preset area may be marked as a normal operation area. The setting of the normal operation area is similar to the setting of the preset area, which can be set by the user, or can be set by the system according to the user's usage rules, or the area non-overlapping with the preset area is set as the normal operation area. For example, as illustrated in FIG. 2b, vertexes (x1, y1), (x1, y2), (x2, y1), and (x2, y2) may be respectively determined at the upper left corner, the bottom left corner, the upper right corner, and the bottom right corner of the touch screen. The four vertexes are connected in order, and an area defined by the four vertexes is the normal operation area 210. The parts of the touch screen except the normal operation area are preset area. The coordinates of the boundary point of the normal operation area may be referenced to determine whether the touch input corresponding to the touch events outside the preset area. For example, when the mobile terminal is in the vertical state, the bottom left corner of the mobile terminal is taken as an origin of the coordinates, a direction of horizontal right is the positive direction of the x-axis, and a direction of vertical up is the positive direction of the y-axis. If the y coordinate of the touch point 211 corresponding to the touch event is between y2 and y1, and the x coordinate of the touch point 211 is between x1 and x2, the touch input corresponding to the touch point 211 can be determined to act outside the preset area. For the touch point 212, the y coordinate is between y2 and y1, and the x coordinate is smaller than x1, the touch input corresponding to the touch point 212 can be determined to act inside the preset area.

In block 303, the touch area corresponding to the touch event is compared with the preset area threshold.

In the embodiment of the present disclosure, if the touch input corresponding to the touch event is detected inside the preset area, the comparison between the touch area and the preset area threshold is performed. The comparison is the same as that in the above embodiment, and details are not described herein again.

In block 304, when the touch area is smaller than the preset area threshold, whether the touch area corresponding to the touch event overlaps with the touch button area is determined.

In block 305, location coordinates corresponding to the touch event may be reported or shielded, according to a determination result.

In block 306, location coordinates corresponding to the touch event can be reported according to the determination result.

In the embodiment of the present disclosure, if the touch input corresponding to the touch event is detected outside the preset area, the touch input can be determined to the normal touch input, and the location coordinates of the touch input can be reported.

In the method for preventing a false-touch on the touch screen provided by the embodiment of the present disclosure, whether the touch input corresponding to the touch event is outside the preset area is determined, according to the location coordinates corresponding to the touch event. The position of the touch input is initially determined and the touch point directly acting on the normal operation area is filtered. The touch point directly acting on the normal operation area may not be processed, the workload is reduced, time is saved, and efficiency is improved.

Figure 4:
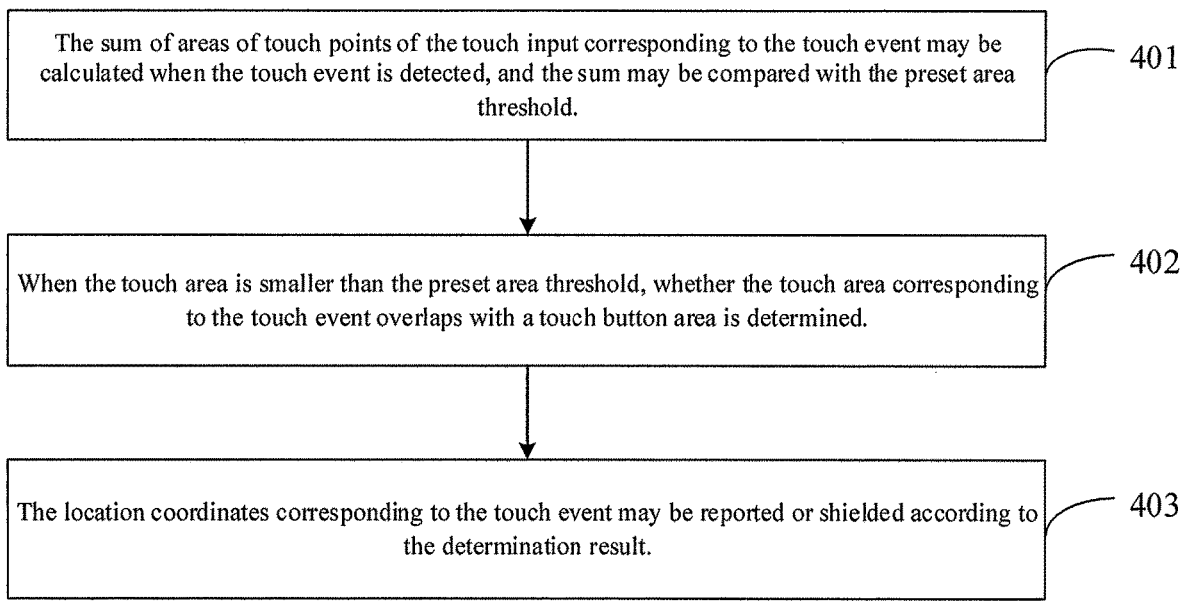
FIG. 4 is another flowchart of the method for preventing the false-touch on the touch screen according to an embodiment of the present disclosure.

FIG. 4 is another flowchart of the method for preventing the false-touch on the touch screen according to an embodiment of the present disclosure. The present embodiment is based on the foregoing embodiment. In this embodiment, the block "comparing a touch area corresponding to the touch event with a preset area threshold" may include calculating a sum of areas of touch points of the touch input corresponding to the touch event, and comparing the sum with the preset area threshold.

The embodiment may include the following blocks.

In block 401, the sum of areas of touch points of the touch input corresponding to the touch event may be calculated when the touch event is detected, and the sum may be compared with the preset area threshold.

In the embodiment of the present disclosure, the multi-touch screen is widely used in the mobile terminal. Different from the traditional single-touch screen, the multi-touch screen may be operated with two hands, multiple fingers, or even multiple people at the same time, and is convenient and user-friendly. When the touch event corresponds to the plurality of touch points, the area of touch areas of the plurality of touch points can be accumulated, and the sum accumulated may be compared with the preset area threshold to determine whether to turn on the function for preventing false-touch on the edge of the screen, thereby determining whether to report the location coordinates of the touch input.

In block 402, when the touch area is smaller than the preset area threshold, whether the touch area corresponding to the touch event overlaps with a touch button area is determined.

In block 403, the location coordinates corresponding to the touch event may be reported or shielded according to the determination result.

In the method provided by the embodiment of the present disclosure, the sum of the areas of the touch points corresponding to the touch event may be determined, and the sum may be compared with the preset area threshold. Considering the multi-touch situation, the area comparison result is more accurate.

Figure 5:
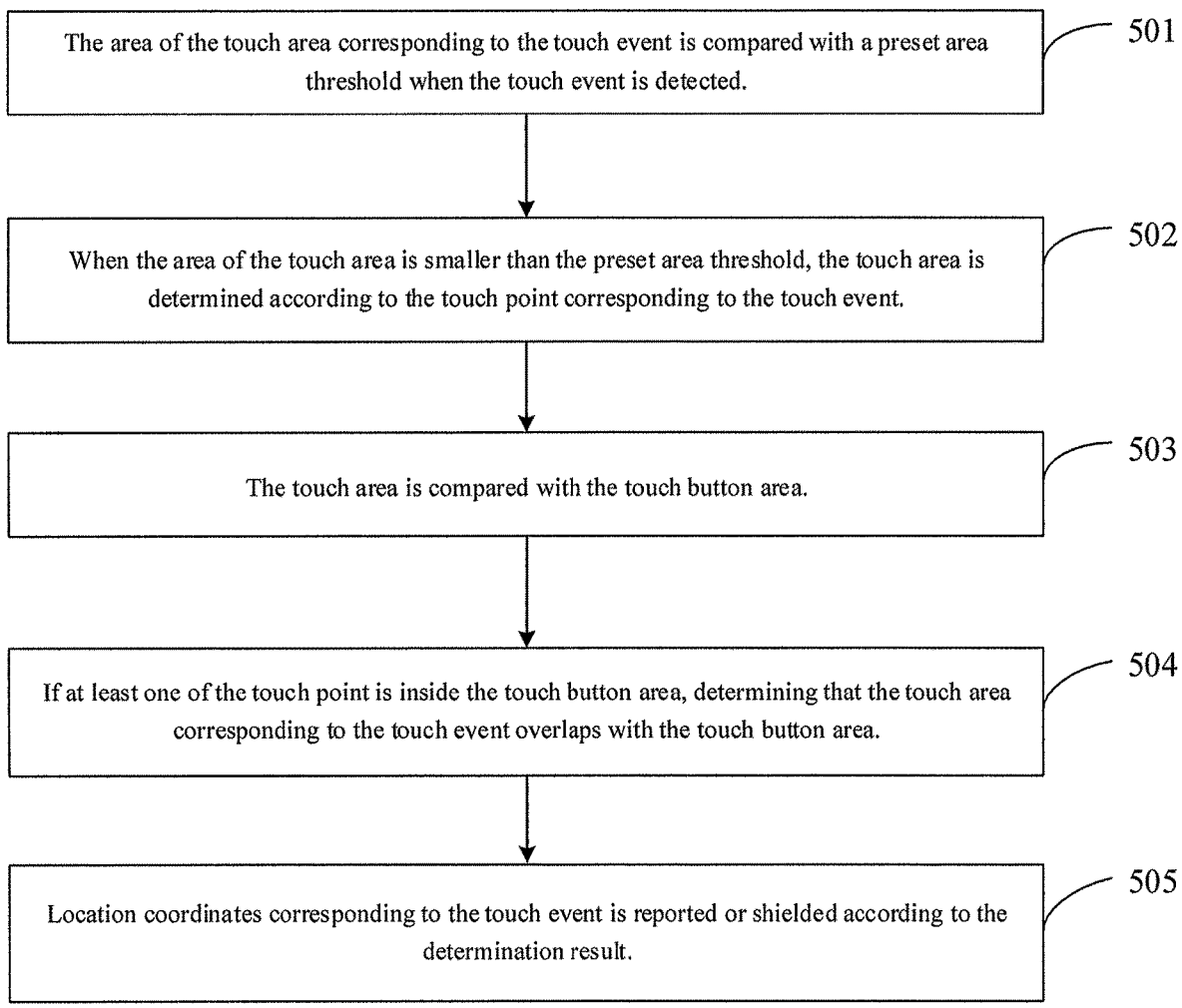
FIG. 5 is another flowchart of the method for preventing the false-touch on the touch screen according to an embodiment of the present disclosure.

FIG. 5 is another flowchart of the method for preventing the false-touch on the touch screen according to an embodiment of the present disclosure. The present embodiment is based on the foregoing embodiment. In this embodiment, the block "whether the touch area corresponding to the touch event overlaps with a touch button area may be determined" is further optimized, and optimized as determining the touch area according to touch points corresponding to the touch event, comparing the touch area with the touch button area, and determining the touch area overlaps with the touch button area, if at least one of the touch point is inside the touch button area.

Correspondingly, the method of this embodiment includes the following blocks.

In block 501, the area of the touch area corresponding to the touch event is compared with a preset area threshold when the touch event is detected.

In block 502, when the area of the touch area is smaller than the preset area threshold, the touch area is determined according to the touch point corresponding to the touch event.

In the embodiment of the present disclosure, the touch area means an area covered by the touch input, and the touch area may be determined by the coordinates of the touch point corresponding to the touch event.

In block 503, the touch area is compared with the touch button area.

In the embodiment of the present disclosure, the touch button area is the same as that in the above embodiment, and details are not described here again.

In block 504, if at least one of the touch points is inside the touch button area, determining that the touch area corresponding to the touch event overlaps with the touch button area.

In the embodiment of the present disclosure, there are two situations in which the touch area overlaps with the touch button area. One is that the touch area does not completely overlap with the touch button area, but an overlapping area is included. The other is that the touch area completely overlaps with the touch button area, that is, the touch area is completely in the touch button area. When at least one of the touch points corresponding to the touch event is located in the touch button area, the touch area and the touch button area overlap, that is at least a part of the touch area is included in the touch button area. If any of the touch points corresponding to the touch event is not included in the touch button area, the touch area and the touch button area have no overlapping area.

In block 505, location coordinates corresponding to the touch event is reported or shielded according to the determination result.

The method for preventing the false-touch on the touch screen provided by the embodiment of the disclosure may determine whether the touch area overlaps with the touch button area by determining whether the touch point corresponding to the touch event is positioned in the touch button area. Whether the touch event is located in the touch button area and its vicinity can be more quickly identified, and a effect for preventing the false-touch is better.

Figure 6:
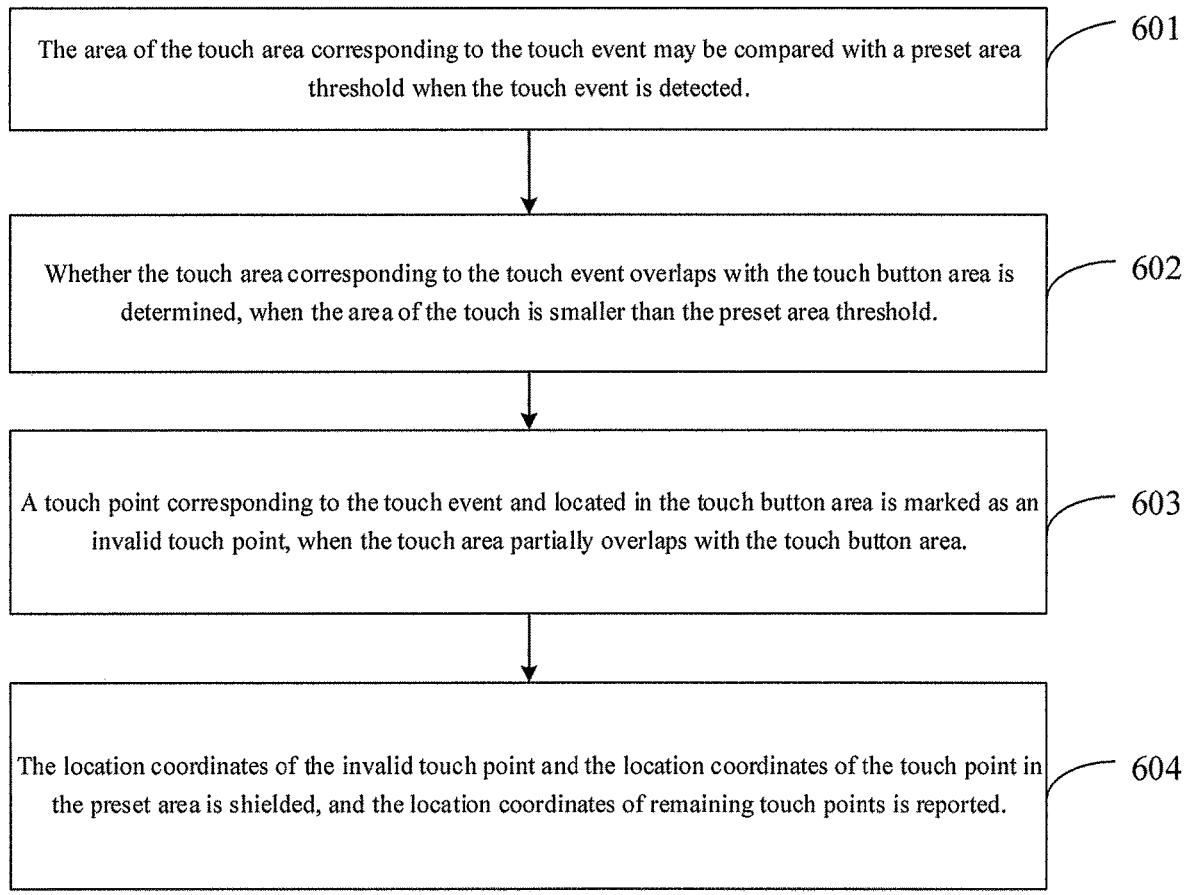
FIG. 6 is another flowchart of the method for preventing the false-touch on the touch screen according to an embodiment of the present disclosure.

FIG. 6 illustrated a flowchart of another method for preventing the false-touch on the touch screen according to an embodiment of the present disclosure. The present embodiment is optimized based on the foregoing embodiment. In this embodiment, the block "reporting or shielding location coordinates corresponding to the touch event according to a determination result" may be refined.

Correspondingly, the method of this embodiment may include the following blocks.

In block 601, the area of the touch area corresponding to the touch event may be compared with a preset area threshold when the touch event is detected.

In block 602, whether the touch area corresponding to the touch event overlaps with the touch button area is determined, when the area of the touch is smaller than the preset area threshold.

In block 603, a touch point corresponding to the touch event and located in the touch button area is marked as an invalid touch point, when the touch area partially overlaps with the touch button area.

In the embodiment of the present disclosure, the overlapping between the touch area corresponding to the touch event and the touch button area means that the touch area and the touch button area have overlapping areas, but the touch area and the touch button area do not completely overlap. In this case, the function for preventing false-touch on the edge of the screen may be turned on, and the touch point located in the touch button area may be marked as the invalid touch point.

In block 604, the location coordinates of the invalid touch point and the location coordinates of the touch point in the preset area is shielded, and the location coordinates of remaining touch points is reported.

In the embodiment of the present disclosure, the touch event corresponding to the invalid touch point and the touch event corresponding to the touch point located in the preset area belong to the false touch input. The location coordinates of the invalid touch point and the touch point in a preset area are shielded, the system does not need to respond to the touch input corresponding to these location coordinates, and the system report the coordinates of the remaining touch points, so that the system responds normally and performs the corresponding function.

The method for preventing the false-touch on the touch screen provided by the embodiment of the disclosure may shield the location coordinates of the touch point located in the touch button area and the location coordinates of the touch point in the preset area, to prevent the false touch, and without affecting the responding of other touch events corresponding to the normal operation.

Figure 7:
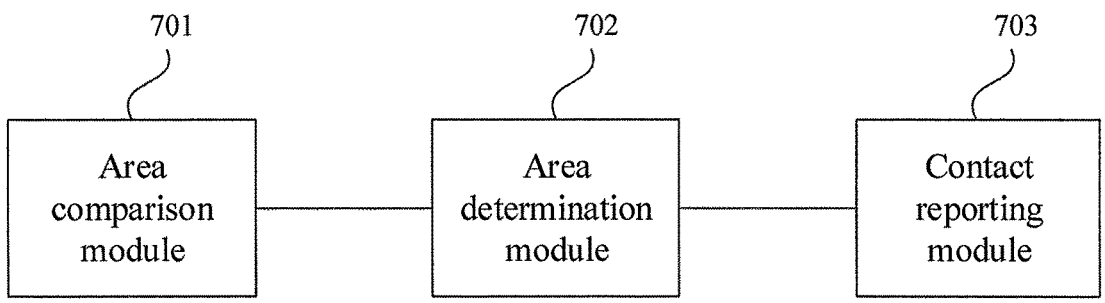
FIG. 7 is a structural block view of a device for preventing the false-touch on the touch screen according to an embodiment of the present disclosure.

FIG. 7 is a structural block view of a device for preventing the false-touch on the touch screen according to an embodiment of the present disclosure. The device may be implemented by software and/or hardware, may be integrated into a mobile terminal, and may control the mobile terminal by performing the method for preventing the false-touch on the touch screen. As illustrated in FIG. 7, the device may include an area comparison module 701, an area determination module 702, and a reporting module 703.

Wherein, the area comparison module 701 is configured to compare an area of a touch area corresponding to a touch event with a preset area threshold, when the touch event is detected. The area determining module 702 is configured to determine whether a touch area corresponding to the touch event overlaps with a touch button area, when the area of the touch area is smaller than the preset area threshold. The reporting module 703 is configured to report or shield location coordinates corresponding to the touch event according to a determination result.

The device for preventing the false-touch on the touch screen provide by the embodiment of the disclosure solves the problem that the function for preventing false-touch on the edge of the screen is invalided, due to the touch input on the touch button area of the touch screen cannot be accurately detected. The accuracy of a touch input reporting is improved in the multi-touch operation, and the effect of improving the processing accuracy of the touch event of the mobile terminal is achieved.

Based on the foregoing embodiments, the device further includes the following modules.

A position determination module may be configured to determine whether the touch input corresponding to the touch event acts inside a preset area, according to the location coordinates corresponding to the touch event, before comparing the area of the touch area corresponding to the touch event with a preset area threshold. If so, the area comparison module 701 is configured to perform the comparison operation.

Based on the foregoing embodiment, the area comparison module 701 is specifically configured to determine the sum of areas of touch points corresponding to the touch event, and compare the sum with the preset area threshold.

Based on the foregoing embodiment, the area determination module specifically 702 is configured to determine the touch area according to a touch point corresponding to the touch event, compare the touch area with the touch button area and determine the touch area overlaps with the touch button area if at least one of the touch point corresponding to the touch event in the touch button area.

Based on the above embodiment, the reporting module 703 is specifically configured to mark a touch point corresponding to the touch event and located in the touch button area as an invalid touch point, when the touch area partially overlaps with the touch button area, the location coordinates of the invalid touch point and location coordinates of a touch point in a preset area are shielded, and the location coordinates of remaining touch points are reported.

Figure 8:
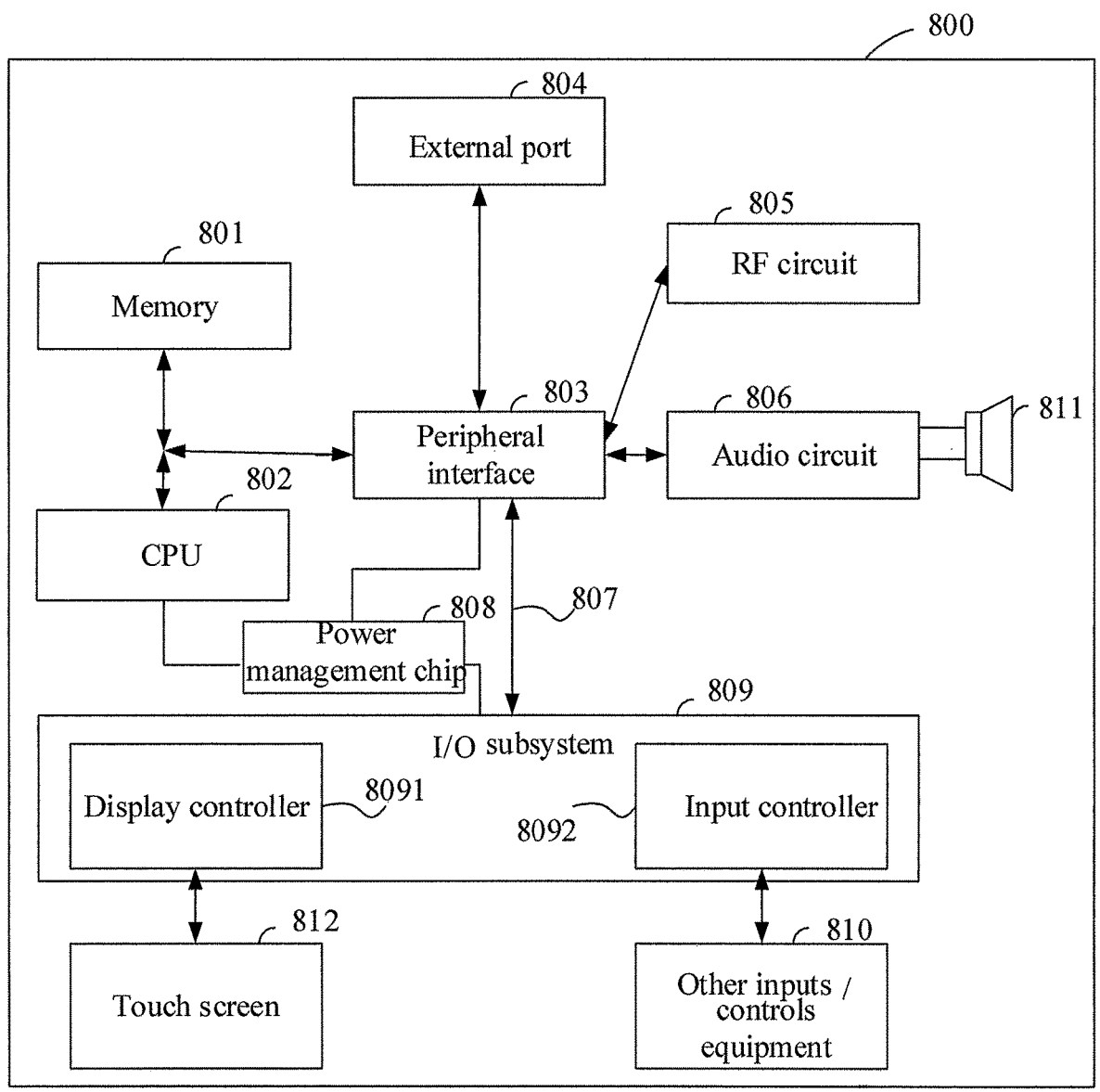
FIG. 8 is a schematic view of a mobile terminal according to an embodiment of the present disclosure.

The embodiment of the disclosure provides a mobile terminal, the device for preventing the false-touch on the touch screen provided by the embodiment of the disclosure can be integrated in the mobile terminal. FIG. 8 is a structural view of the mobile terminal according to the embodiment of the present disclosure. As illustrated in FIG. 8, the mobile terminal may include a housing (not shown in the drawing), a memory 801, a central processing unit 802 (CPU, also referred to as a processor, hereinafter referred to as a CPU), and a circuit board (not shown in the drawing), a touch screen 812 and a power circuit (not shown). The touch screen 812 is configured to convert a user's operation into an electrical signal, input the electrical signal to the processor, and display a visual output signal. The circuit board is disposed inside the space defined by the touch screen 812 and the housing. The CPU 802 and the memory 801 are disposed on the circuit board. The power circuit is configured to supply power to each circuit or component of the mobile terminal. The memory 801 is configured to store a computer program. The CPU 802 is configured to read and execute the computer program stored in the memory 801. The CPU 802, when executing the computer program, implements the following blocks: comparing an area of a touch corresponding to a touch event with a preset area threshold, when the touch event is detected; determining whether a touch area corresponding to the touch event overlaps with a touch button area, when the area of the touch is smaller than the preset area threshold; and reporting or shielding location coordinates corresponding to the touch event according to a determination result.

The mobile terminal may further include a peripheral interface 803, an RF (Radio Frequency) circuit 805, an audio circuit 806, a speaker 811, a power management chip 808, an input/output (I/O) subsystem 809, other input/control equipment 810 and external port 804, these components communicate via one or more communication buses or signal lines 807.

In the embodiment, the illustrated mobile terminal 800 is merely one example of mobile terminals, and the mobile terminal 800 may have more or fewer components than those shown in the figures, two or more components may be combined, or the mobile terminal may have different component configurations. The various components shown in the figures can be implemented in a hardware, a software, or a combination of the hardware and the software including one or more signal processing circuits and/or application-specific integrated circuits.

The mobile terminal integrated with the device for preventing the false-touch on the touch screen provided in this embodiment is described in detail below. The mobile terminal takes a mobile phone as an example.

The memory 801 can be accessed by the CPU 802, the peripheral interface 803, etc., and the memory 801 can include a high speed random access memory, and can also include a nonvolatile memory, such as one or more magnetic disk storage devices, flash memory devices or other volatile solid-state storage devices.

The peripheral interface 803 can connect the input peripherals and output peripherals of the terminal to the CPU 802 and the memory 801.

The I/O subsystem 809 can connect the input peripherals and output peripherals on the terminal, such as the touch screen 812 and other input/control equipment 810, to peripheral interface 803. The I/O subsystem 809 can include a display controller 8091 and one or more input controllers 8092 for controlling other input/control equipment 810. Wherein, one or more input controllers 8092 receive electrical signals from other input/control equipment 810 or transmit electrical signals to other input/control equipment 810. Other input/control equipment 810 may include physical buttons (press buttons, rocker buttons, etc.), dial, slide switch, joystick, and click wheel. In the embodiment, the input controller 8092 can be connected to any of the following: a keyboard, an infrared port, a USB interface, and a pointing device such as a mouse.

The touch screen 812 is an input interface and an output interface between the mobile terminal and the user, and displays the visual output to the user. The visual output may include graphics, text, icons, videos, and the like.

The display controller 8091 in the I/O subsystem 809 may receive an electrical signal from the touch screen 812 or transmit an electrical signal to the touch screen 812. The touch screen 812 is configured to detect the touch on the touch screen, and the display controller 8091 converts the touch detected into an interaction with the user interface object displayed on the touch screen 812, that is, implement human-computer interaction. The user interface object displayed on the touch screen 812 may be the icon of a game, the icon of networking to a corresponding network, and the like. The terminal may also include a light mouse, which is a touch sensitive surface that does not display a visual output, or an extension of a touch sensitive surface formed by the touch screen.

The RF circuit 805 is mainly used for establishing communication between the mobile phone and the wireless network (that is the network side), and realizing data reception and transmission between the mobile phone and the wireless network. For example, sending or receiving messages, emails, and the like. Specifically, the RF circuit 805 is configured to receive and transmit an RF signal, which is also referred to as an electromagnetic signal. The RF circuit 805 converts the electrical signal into an electromagnetic signal or converts the electromagnetic signal into the electrical signal, and communicates with a communication network or other equipment through the electromagnetic signal. The RF circuitry 805 may include known circuitry for performing these functions including but not limited to an antenna system, an RF transceiver, one or more amplifiers, a tuner, one or more oscillators, a digital signal processor, a CODEC (COder-DECoder) chipset, Subscriber Identity Module (SIM), etc.

The audio circuit 806 is mainly configured to receive audio data from the peripheral interface 803, convert the audio data into an electrical signal, and transmit the electrical signal to the speaker 811.

The speaker 811 is configured to restore the voice signal received by the mobile phone from the wireless network through the RF circuit 805 to sound and play the sound to the user.

The power management chip 808 is configured to provide power and power management of the hardware connected to the CPU 802, the I/O subsystem and the peripheral interface.

The device for preventing the false-touch on the touch screen and the terminal provided in the above embodiments can perform the method for prevent the false-touch on the touch screen provided by any embodiment of the present disclosure, and have the corresponding functional modules and beneficial effects of performing the method. For technical details that are not described in detail in the above embodiments, reference may be made to the method for prevent the false-touch on the touch screen provided by any embodiment of the present disclosure.

In another embodiment of the present disclosure, a storage medium is disclosed. The storage medium is configured to store program code, and when the program code is executed by the processor, the processor performs the following steps: comparing an area of a touch rear corresponding to a touch event with a preset area threshold, when the touch event is detected; determining whether the touch area corresponding to the touch event overlaps with a touch button area, when the area of the touch area is smaller than the preset area threshold; and reporting or shielding location coordinates corresponding to the touch event according to a determination result.

Optionally, before the comparing an area of a touch area corresponding to a touch event with a preset area threshold, the method further includes: determining whether the touch input corresponding to the touch event is outside a preset area, according to the location coordinates corresponding to the touch event; if the touch input is inside the preset area, comparing the area of the touch area corresponding to a touch event with the preset area threshold.

Optionally, the step of comparing an area of a touch area corresponding to a touch event with a preset area threshold includes determining: a sum of areas of touch spots corresponding to the touch event, comparing the sum with the preset area threshold.

Optionally, the step of determining whether a touch area corresponding to the touch event overlaps with a touch button area includes: determining the touch area according to a touch point corresponding to the touch event, comparing the touch area with the touch button area, determining the touch area overlaps with the touch button area if at least one of the touch point is positioned in the touch button area.

Optionally, the step of reporting or shielding location coordinates corresponding to the touch event according to a determination result includes: marking a touch point corresponding to the touch event and located in the touch button area as an invalid point, when the touch area partially overlaps with the touch button area; shielding the location coordinates of the invalid spot and location coordinates of a touch spot in a preset area, and reporting the location coordinates of remaining touch points.

It should be noticed that the above are only the embodiments of the present disclosure and the principle of the applied techniques. Those skilled in the art will appreciate that the present disclosure is not limited to the specific embodiments described herein and that various modifications, changes and substitutions may be made by those skilled in the art without departing from the scope of the disclosure. Therefore, the present disclosure has been described in detail by the above embodiments, but the present disclosure is not limited to the above embodiments, and other equivalent embodiments may be included without departing from the inventive concept. The scope is determined by the scope of the appended claims.

What is claimed is:

1. A method for preventing a false-touch on a touch screen, comprising:
    comparing an area of a touch area corresponding to a touch event with a preset area threshold, when the touch event is detected;
    determining whether the touch area corresponding to the touch event overlaps with a touch button area, when the area of the touch area is smaller than the preset area threshold, wherein the touch button area comprises a touch button;
    when the touch area corresponding to the touch event partially overlaps with the touch button area, marking a touch point corresponding to the touch event which is inside the touch button area as an invalid touch point, performing a shielding operation on the location coordinates of the invalid touch point and location coordinates of a touch point which is inside a preset area, and performing a reporting operation on the location coordinates of the remaining touch points corresponding to the touch event; wherein the touch event corresponding to the shielded location coordinates is determined to be the false-touch and not responded, and the touch event corresponding to the reported location coordinates is responded and performed; and
    when the touch area corresponding to the touch event does not overlap with the touch button area, performing a reporting operation on the location coordinates corresponding to the touch event.

2. The method as claimed in claim 1, wherein before comparing an area of a touch area corresponding to a touch event with a preset area threshold, the method further comprises:
    determining whether a touch input corresponding to the touch event is outside the preset area or not, according to the location coordinates corresponding to the touch event; and
    comparing the area of the touch area with the preset area threshold when the touch input is inside the preset area.

3. The method as claimed in claim 2, wherein the touch screen is a multi-touch screen, the touch event corresponds to a plurality of touch points, each of the plurality of touch points corresponds to one touch area, wherein comparing an area of a touch area corresponding to a touch event with a preset area threshold comprises:

calculating a sum of areas of the touch areas corresponding to the touch event; and
comparing the sum with the preset area threshold.

4. The method as claimed in claim 1, wherein the touch screen is a multi-touch screen, the touch event corresponds to a plurality of touch points, each of the plurality of touch points corresponds to one touch area, wherein determining whether a touch area corresponding to the touch event overlaps with a touch button area comprises:
determining the touch areas according to the touch points;
comparing the touch areas with the touch button area; and
determining that the touch areas overlap with the touch button area when at least one of the touch areas is inside the touch button area.

5. A device for preventing a false-touch on a touch screen, comprising:
an area comparison module configured to compare an area of a touch area corresponding to a touch event with a preset area threshold, when the touch event is detected;
an area determination module configured to determine whether the touch area corresponding to the touch event overlaps with a touch button area, when the area of the touch area is smaller than the preset area threshold; and
a reporting module configured to mark a touch point corresponding to the touch event which is inside the touch button area as an invalid touch point, perform a shielding operation on the location coordinates of the invalid touch point and location coordinates of a touch point which is inside a preset area, and perform a reporting operation on the location coordinates of the remaining touch points corresponding to the touch event, when the touch area corresponding to the touch event partially overlaps with the touch button area;
wherein the reporting module is further configured to perform a reporting operation on the location coordinates corresponding to the touch event, when the touch area corresponding to the touch event does not overlap with the touch button area;
wherein the touch button area comprises a touch button; the touch event corresponding to the shielded location coordinates is determined to be the false-touch and is not responded, and the touch event corresponding to the reported location coordinates is responded and performed.

6. The device as claimed in claim 5, wherein further comprises:
a position determination module, configured determine according to the location coordinates corresponding to the touch event, whether a touch input corresponding to the touch event is outside the preset area or not, before comparing an area of a touch area corresponding to a touch event with a preset area threshold.

7. The device as claimed in claim 6, wherein the touch screen is a multi-touch screen, the touch event corresponds to a plurality of touch points, each of the plurality of touch points corresponds to one touch area, the area comparison module is further configured to calculate a sum of areas of touch areas corresponding to the touch points and compare the sum with the preset area threshold.

8. The device as claimed in claim 5, wherein the touch screen is a multi-touch screen, the touch event corresponds to a plurality of touch points, each of the plurality of touch points corresponds to one touch area; the area determination module is further configured to determine the touch areas according to the touch points compare the touch areas with the touch button area, and determine that the touch areas overlap with the touch button area when at least one of the touch points is inside the touch button area.

9. A mobile terminal, comprising a memory, a processor, and a computer program stored in the memory and executable by the processor, wherein the processor implements a method for preventing a false-touch on a multi-touch screen when executing the computer program, and the method comprises:
determining a plurality of touch areas when touch inputs are detected on the multi-touch screen, the plurality of touch areas corresponding to a plurality of touch points detected;
determining whether the touch areas overlap with a touch button area, the touch button area comprising a touch button;
marking one of the plurality of the touch points which is inside the touch button area as an invalid touch point performing a, shielding operation on the location coordinates of the invalid touch point and location coordinates of another one of the plurality of touch points which is inside a preset area, and performing a reporting operation on the location coordinates of the remaining touch points, when the touch areas partially overlap with the touch button area; wherein the touch input corresponding to the shielded location coordinates is determined to be the false-touch and not responded, and the touch input corresponding to the reported location coordinates is responded and performed; and
performing a reporting operation on the location coordinates of the touch points when the touch areas do not overlap with the touch button area.

10. The mobile terminal as claimed in claim 9, wherein the touch areas do not overlap with the touch button area when any of the touch points is not included in the touch button area.

11. The mobile terminal as claimed in claim 9, wherein the touch areas at least partially overlap with the touch button area when at least one of the touch points is located in the touch button area.

12. The mobile terminal as claimed in claim 9, wherein the method further comprises:
releasing touch information of the false touch.

13. The mobile terminal as claimed in claim 9, wherein before determining whether the touch areas overlap with a touch button area, the method further comprises:
calculating a sum of areas of the touch areas; and
comparing the sum with a preset area threshold;
wherein the operation of determining whether the touch areas overlap with a touch button area is performed in response to that the sum is smaller than the preset area threshold.

* * * * *

UNITED STATES PATENT AND TRADEMARK OFFICE
CERTIFICATE OF CORRECTION

PATENT NO. : 10,969,903 B2
APPLICATION NO. : 16/438048
DATED : April 6, 2021
INVENTOR(S) : Qiang Zhang et al.

Page 1 of 1

It is certified that error appears in the above-identified patent and that said Letters Patent is hereby corrected as shown below:

On the Title Page

Item (63) Related U.S. Application Data:
"Continuation of application No. 16/215,370, filed on Dec. 10, 2018, and a continuation of application No. PCT/CN2017/107537, filed on Oct. 24, 2017"

Should read as:
-- Continuation of application No. 16/215,370, filed on Dec. 10, 2018, which is a continuation of application No. PCT/CN2017/107537, filed on Oct. 24, 2017 --

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*